United States Patent Office 2,727,895
Patented Dec. 20, 1955

2,727,895

ALPHA-ALKYLATED, 4-BENZYL PYRIDINES AND CERTAIN SUBSTITUTION DERIVATIVES

Nathan Sperber and Domenick Papa, Bloomfield, N. J., assignors to Schering Corporation, Bloomfield, N. J., a corporation of New Jersey No Drawing. Application May 11, 1953,
Serial No. 354,392

9 Claims. (Cl. 260—290)

This invention relates to a new group of compounds having important therapeutic properties and to processes for manufacturing the same.

More particularly the invention relates to substituted benzylpyridines and piperidines exhibiting a high degree of anticonvulsant activity. Furthermore, the compounds of this invention have antibacterial and antifungal properties.

The compounds of the present invention include the free bases and their non-toxic acid addition and quaternary salts of the general formula

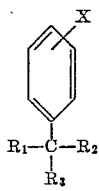

wherein X is a member of the group comprising hydrogen, halogen, lower alkyl, lower alkoxy, and amino, $R_1$ is a member of the group comprising H, lower alkyl, lower alkenyl, monocyclic aralkyl, cycloalkyl, cycloalkenyl and monocyclic aryl and $R_2$ is a member of the group comprising lower alkyl, lower alkenyl, monocyclic aralkyl, cycloalkyl, and cycloalkenyl, and $R_3$ is a member of the group comprising pyridyl and piperidyl.

Of particular value are compounds of the group defined above in which $R_1$ is hydrogen or lower alkyl, $R_2$ is a lower alkyl group and $R_3$ is a 4-pyridyl group.

The compounds of the present invention can be prepared by a variety of methods, some of which are illustrated in the following equations:

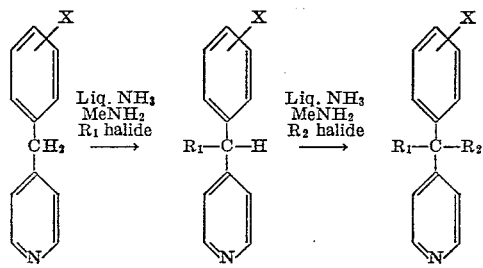

wherein $R_1$ and $R_2$ are as above defined and Me is an alkali metal. The above sequence can be reduced to a one-step process whereby the methylene group is substituted by two similar groups. The condensing agents are not necessarily restricted to alkali metal amides since other agents such as lithium alkyl, lithium aryls, alkali metal alkoxides, Grignard reagents (such as alkyl magnesium bromide) and triphenylmethylsodium may be used. In brief, the reaction is adaptable to the type of condensing agent employed. Specifically, α-ethyl-4-benzylpyridine may alternatively be prepared as follows:

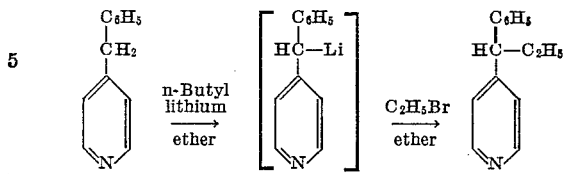

The benzylpyridines, employed as starting materials are generally known compounds and can be easily prepared, according to the known procedures.

An alternate synthesis of α-substituted benzylpyridines is exemplified by the following equation:

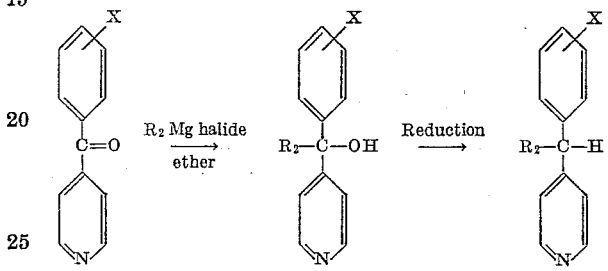

The benzoylpyridines are easily prepared according to general methods reported in the literature, for example Chichibabin, J. Russ. Phys. Chem. Soc., 33, 701 (1901). This procedure is not necessarily limited to Grignard reactions, as lithium hydrocarbons are equally effective as condensing agents. Replacement of the hydroxy group by hydrogen can be effected in a usual manner such as: treating the carbinol with hydrogen iodide and phosphorus; reacting the carbinol with a halogenating agent such as thionylchloride or phosphorus pentachloride and reducing with $H_2$ in the presence of a catalyst such as Raney nickel. Alternatively, the tertiary carbinol, provided the $R_2$ group contains an α-hydrogen atom, may be dehydrated by warming with a strong mineral acid, such as sulfuric acid, and the resulting olefin hydrogenated in the presence of a catalyst to yield the desired substituted benzylpyridine. The following reactions depict this method of conversion:

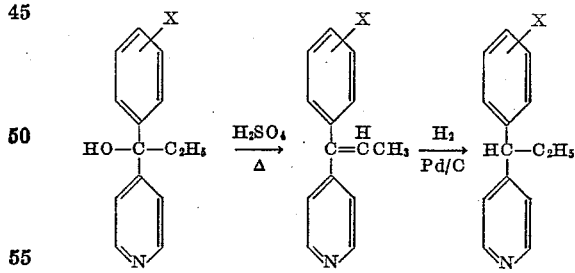

It will be understood that the mono-α-substituted benzylpyridine may be further alkylated as previously described to yield an α,α-disubstituted benzylpyridine.

In addition to the aforementioned methods the following reaction sequence is applicable:

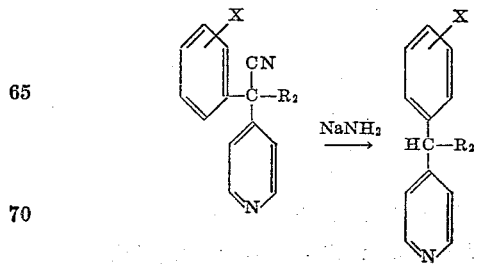

If the pyridyl moiety of the nitrile is attached through its 2- or 4-position, the nitrile group may be replaced by hydrogen by heating with aqueous sulfuric acid.

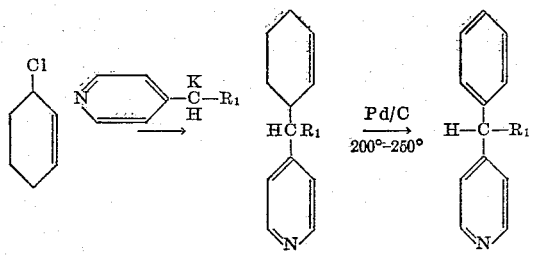

Reaction of cycloalkenyl halide with an ω-substituted α- or γ-picoline in liquid ammonia and an alkali metal amide effects condensation as shown. Aromatization in the usual manner affords the benzylpyridine desired.

The substances containing the piperidyl residue are prepared from the corresponding pyridyl compounds. For example, by treating the pyridyl compound with the appropriate quaternarizing reactant such as an alkyl halide or alkyl p-toluenesulfonate and reducing the quaternary salt with hydrogen in the presence of platinum oxide, there is obtained the N-alkylated benzylpiperidine.

Alternatively, the pyridine compounds may be converted to the corresponding piperidyl compounds by reduction with hydrogen in acetic acid in the presence of platinum oxide or by subjecting the acid salt in ethanol to the action of hydrogen in the presence of platinum oxide.

The piperidyl compounds are easily converted by well known procedures into their quaternary salts. For example, reaction of a compound containing the N-methyl-piperidyl moiety with an alkyl halide with or without a solvent such as ether or benzene yields the corresponding N-methyl-N-alkyl quaternary salt. These salts are generally recrystallizable from either ethanol or ethanol-ether.

The compounds of this invention may be administered in a variety of the usual pharmaceutical forms, such as tablets, elixirs, solutions and capsules, and the like.

EXAMPLE I

1-phenyl-1-(4-pyridyl)propane

To a suspension of sodium amide (from 24 g. of sodium) in 1.5 liters of liquid ammonia there is added dropwise 169 g. 4-benzylpyridine. After stirring the mixture for 15 minutes, 120 g. of ethyl bromide is added slowly. The ammonia is allowed to evaporate, the residue decomposed with water and the oil extracted with benzene. Removal of the benzene by distillation in vacuo and refractionation of the residue yields 185 g. of 1-phenyl-1-(4-pyridyl)propane, B. P. 135–137° C./3 mm.

EXAMPLE II

1-phenyl-1-(4-pyridyl)pentane

To a suspension of potassium amide (from 12 g. of potassium) in one liter of liquid ammonia there is added dropwise 52 g. of 4-benzylpyridine. After 15 minutes, 42 g. of n-butyl bromide is added and the reaction mixture processed according to Example I to yield 63 g. of 1-phenyl-1-(4-pyridyl)pentane, B. P. 132–136° C./1.5 mm.

EXAMPLE III

1-phenyl-1-(4-pyridyl)nonane

From the reaction of potassium amide (from 4 g. of potassium) 17 g. of 4-benzylpyridine and 19 g. of n-octyl bromide in 500 ml. of liquid ammonia, there is obtained 22 g. of the nonane, B. P. 173–178° C./2 mm.

EXAMPLE IV

1-phenyl-1-(4-pyridyl)isobutane

From 4 g. of potassium, 17 g. of 4-benzylpyridine and 14 g. of isopropyl bromide, according to the procedure of Example II, there is obtained 19 g. of 1-phenyl-1-(4-pyridyl)isobutane, B. P. 130°–134° C./1 mm., M. P. 51–52° C.

EXAMPLE V

1-phenyl-1-(4-pyridyl)isopentane

By reacting potassium amide (from 8 g. of potassium) with 34 g. of 4-benzylpyridine and 27.5 g. of isobutyl bromide in one liter of liquid ammonia according to the procedure of Example I, there is obtained the desired product, B. P. 122–128° C./1 mm.

EXAMPLE VI

4-phenyl-4-(4-pyridyl)butene-1

By reacting 33.8 g. of 4-benzylpyridine and 24.4 g. of allyl bromide with potassium amide (from 8 g. of potassium) in about one liter of liquid ammonia there is obtained 41 g. of the desired olefin, B. P. 125–135° C./0.5 mm.

EXAMPLE VII

3-phenyl-3-(4-pyridyl)pentane

To a suspension of potassium amide (from 3.1 g. of potassium) in 500 ml. of liquid ammonia, there is added 15 g. of 1-phenyl-1-(4-pyridyl)propane obtained as in Example I. After stirring for 15 minutes, 10 g. of ethyl bromide is added dropwise and the mixture processed according to the procedure of Example II, to yield 15 g. of the disubstituted benzylpyridine, B. P. 126–130° C./1 mm.

EXAMPLE VIII

Cyclohexyphenyl-4-pyridyl methane

From 21 g. of potassium, 91 g. of 4-benzylpyridine and 88 g. of cyclohexyl bromide in 1.5 liters of liquid ammonia according to the procedure of Example II, there is obtained cyclohexyphenyl-4-pyridyl methane, B. P. 168–175° C./1 mm., M. P. 84–85° C.

EXAMPLE IX

1-p-chlorophenyl-1-(4-pyridyl)propane

To a mixture of 12 g. of p-chlorophenyl-4-benzyl-pyridine and potassium amide (2.5 g. potassium) in 500 ml. of liquid ammonia, there is added 8 g. of ethyl bromide. By following the procedure of Example II, the above-identified substance is obtained, yield 9 g., B. P. 150–157° C./1 mm.

EXAMPLE X

1-p-aminophenyl-1-(4-pyridyl)propane

To a cooled solution of 11 ml. of concentrated nitric acid and 14 ml. of concentrated sulfuric acid there is slowly added a solution of 1-phenyl-1-(4-pyridyl)propane, 35 ml. of cold, concentrated sulfuric acid. During the addition, the reaction temperature is maintained between 0° and 5° C. After stirring the mixture at room temperature for 4 hours, it is poured over ice and made alkaline with sodium carbonate. The resultant oily layer is extracted with ether, the ether extracts dried and concentrated to a residue yielding the crude nitro compound. The crude nitro compound is dissolved in 20 g. of concentrated hydrochloric acid and while cooling there is added a solution of 80 g. of stannous chloride in 100 ml. of concentrated hydrochloric acid. After the addition, the reaction mixture is heated on a steam bath for 15 minutes and then cooled, whereupon an oil separates. The supernatant liquid is decanted and the oil dissolved in water. The aqueous solution is made alkaline with sodium hydroxide and extracted with ether. After drying, the ether extracts are concentrated and the residual oil is triturated with petroleum ether. Recrystallization from benzene-hexane yields 5.5 g. of 1-p-aminophenyl-1-(4-pyridyl)propane, M. P. 83–84° C.

EXAMPLE XI

1-phenyl-1-(2-pyridyl)propane

A solution of 44 g. of α-phenyl-α-(2-pyridyl)butyronitrile and 400 g. of 80% sulfuric acid is stirred and heated at 140° C. for 10 hours. The solution is then cooled, poured on ice and made alkaline with sodium hydroxide solution. After extracting the mixture with ether, the ether extracts are dried and concentrated to yield a residual oil which, upon fractionation, gives 34 g. of 1-phenyl-1-(2-pyridyl)propane, B. P. 102–108° C./0.5 mm.

EXAMPLE XII

1-phenyl-1-(3-pyridyl)propane

A solution of 12 g. of 1-phenyl-1-(3-pyridyl)propanol-1, 19 ml. of glacial acetic acid, 5 ml. of concentrated hydrochloric acid and 20 ml. of 47% hydriodic acid is refluxed for 10 minutes. The reaction mixture is then poured into a solution of 8 g. of sodium bisulfite in 75 ml. of water, made alkaline with sodium hydroxide solution and then extracted with ether. After drying the ether extracts and removing the solvent in vacuo, the residue is distilled to give 8.5 g., B. P. 136–140° C./2 mm.

EXAMPLE XIII

1-phenyl-1-(4-pyridyl)propene

A solution of 17 g. of 1-phenyl-1-(4-pyridyl)-propanol-1 and 175 ml. of 40% sulfuric acid is heated on the steam bath for 18 hours. The reaction mixture is poured on ice made alkaline with sodium hydroxide and extracted with ether. Fractionation of the ether solution gives 1-phenyl-1-(4-pyridyl)propene, B. P. 150–153° C./7 mm.

The compound of Example I is obtained by reducing 10 g. of the propene in ethanol with hydrogen at 50 lbs./sq. in. in the presence of palladium on carbon catalyst. After removing the catalyst by filtration and concentration the filtrate, the propane of Example I is obtained upon fractionation.

EXAMPLE XIV

Phenyl-1-(4-pyridyl)propane hydrogen sulfate

To a solution of 9.2 g. of the free base from Example I in 75 ml. of acetone, there is added 4.56 g. of concentrated sulfuric acid. Chilling the solution yields 11 g. of white crystalline material, M. P. 106–107° C. upon recrystallization from ethanol-ether.

EXAMPLE XV

1-phenyl-1-(4-pyridyl)propane hydrobromide

A solution of the free base from Example I in anhydrous ether is treated with anhydrous hydrogen bromide to yield the above-identified salt, M. P. 107–108° C.

EXAMPLE XVI

1-phenyl-1-(3-pyridyl)ethane

To a solution of potassium amide (from 4 g. of potassium in 300 ml. of liquid ammonia), there is added 16.9 g. of 3-benzylpyridine, followed by the dropwise addition of 15 g. of methyl iodide. By proceeding according to Example II there is obtained 1-phenyl-1-(3-pyridyl)-ethane, B. P. 121–124° C./2 mm.

EXAMPLE XVII

1-p-methylphenyl-1-(2-pyridyl)-n-hexane

Butyl lithium is prepared in the usual manner from 3.1 g. of lithium and 18.5 g. of n-butyl chloride in 120 ml. of anhydrous ether. After chilling the ether solution to 0°–10° C. 36.6 g. of p-methyl-2-benzylpyridine is added dropwise and the mixture stirred and refluxed for 1 hour. Thirty-one grams of n-amyl bromide is then added slowly and the mixture stirred at room temperature for 18 hours. After decomposition of the reaction mixture with water, the ether layer is separated, dried and concentrated. Fractionation of the residue yields 1-p-methylphenyl-1-(2-pyridyl)-n-hexane, B. P. 137–141° C./1 mm.

EXAMPLE XVIII

1-phenyl-1-(4-pyridyl)ethane

To a cold solution of butyl lithium (3.1 g. of lithium and 18.5 g. of n-butyl chloride) in 150 ml. of anhydrous ether under an atmosphere of nitrogen there is added 34 g. of 4-benzylpyridine. After stirring and refluxing for one hour, 30 g. of methyl iodide is slowly added and the reaction mixture processed according to Example XVII to yield 1-phenyl-1-(4-pyridyl)ethane, B. P. 124–127° C./2.5 mm.

EXAMPLE XIX

1-phenyl-1-(2-pyridyl)butane

To a stirred solution of n-propyl magnesium bromide (4.8 g. of magnesium and 25 g. of n-propyl bromide) in 200 ml. of anhydrous ether, there is added dropwise a solution of 36.6 g. of 2-benzoylpyridine in 100 ml. of ether. After stirring and refluxing for 8 hours, the reaction mixture is decomposed with dilute hydrochloric acid followed by treatment with excess sodium hydroxide solution. The oily layer is extracted with ether, dried and concentrated to a residue. By dissolving the crude carbinol in 60 ml. of glacial acetic acid, 60 ml. of 47% hydriotic acid and 16 ml. of hydrochloric acid and following the procedure of Example XII, there is obtained 1-phenyl-1-(2-pyridyl)butane, B. P. 130–134° C./2 mm.

EXAMPLE XX

1-phenyl-1-(4-pyridyl)heptane

To a solution of n-hexyl magnesium bromide (4.8 g. of magnesium and n-hexyl bromide) in 200 ml. of dried ether is added a solution of 36.6 g. of 4-benzoylpyridine in 100 ml. of ether. By following the procedure of Example XIX there is obtained 1-phenyl-1-(4-pyridyl)-heptane, B. P. 162–165° C./2.5 mm.

EXAMPLE XXI

1-phenyl-1-(N-methyl-4-piperidyl)propane

A mixture of 25 g. of 1-phenyl-1-(4-pyridyl)propane (from Example I) and 25 g. of methyl p-toluenesulfonate is heated on a steam bath for one hour. After cooling, the viscous oil is triturated with benzene, filtered and dissolved in absolute ethanol and reduced with hydrogen at 50 lbs. sq. in., using platinum oxide catalyst. After filtration, the filtrate is concentrated in vacuo and the residual oil dissolved in 200 ml. of water. The aqueous solution is made alkaline with dilute sodium hydroxide and the oily layer extracted with ether. Fractionation yields 26 g. of 1-phenyl-1-(N-methyl-4-piperidyl)propane, B. P. 109–114° C./2 mm.

EXAMPLE XXII

Cyclohexylphenyl-N-methyl-4-piperidylmethane

A solution of 15 g. of cyclohexylphenyl-4-pyridylmethane in 100 ml. of hydrochloric acid is reduced with hydrogen in the presence of platinum oxide, at 50 lbs. sq. in. The residue, after filtration and concentration of the filtrate, is treated with dilute sodium hydroxide and the oil extracted with ether. The ether extracts are dried and concentrated, and the residue fractionated to yield 12.5 g. of cyclohexylphenyl-4-piperidylmethane, B. P. 150–155° C./1 mm. The base is methylated with formic acid and formaldehyde in the usual manner to yield 9.5 g. α-cyclohexyl-N-methyl-4-benzylpiperidine, M. P. 156–160° C./1 mm.

We claim:

1. Compounds of the group consisting of bases of the formula

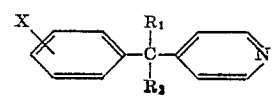

wherein X is a member of the group consisting of hydrogen, halogen, lower alkyl, lower alkoxy and amino, $R_1$ is a member of the group consisting of hydrogen and lower alkyl, and $R_2$ is a lower alkyl group and their non-toxic acid addition salts.

2. 1-phenyl-1-(4-pyridyl)propane.
3. 1-phenyl-1-(4-pyridyl)pentane.
4. 1-phenyl-1-(4-pyridyl)isobutane.
5. 3-phenyl-3-(4-pyridyl)pentane.
6. 1-p-chlorophenyl-1-(4-pyridyl)propane.
7. Compounds of the formula

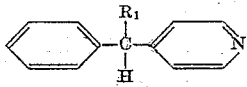

wherein $R_1$ is a lower alkyl group.

8. Compounds of the formula

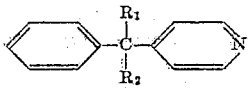

wherein $R_1$ and $R_2$ are lower alkyl groups.

9. Compounds of the formula

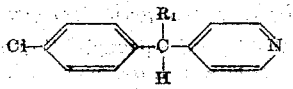

wherein $R_1$ is a lower alkyl group.

References Cited in the file of this patent
UNITED STATES PATENTS 2,599,365   Berger et al. _____ June 3, 1952

OTHER REFERENCES

Beilstein, vol. 20, pp. 425–28 (1935).